US011364096B2

(12) United States Patent
Clunet-Coste et al.

(10) Patent No.: US 11,364,096 B2
(45) Date of Patent: Jun. 21, 2022

(54) CROWN AND ROOT DENTAL RESTORATION, METHOD FOR PERFORMING ONE SUCH RESTORATION AND METHOD FOR ETCHING ONE SUCH DENTAL RESTORATION

(71) Applicants: Bruno Clunet-Coste, Saint-Etienne de Crossey (FR); Bernard Maneuf, Voiron (FR); André Collombin, Voiron (FR)

(72) Inventors: Bruno Clunet-Coste, Saint-Etienne de Crossey (FR); Bernard Maneuf, Voiron (FR); André Collombin, Voiron (FR)

( * ) Notice: Subject to any disclaimer, the term of this patent is extended or adjusted under 35 U.S.C. 154(b) by 532 days.

(21) Appl. No.: 16/159,225

(22) Filed: Oct. 12, 2018

(65) Prior Publication Data

US 2019/0110864 A1   Apr. 18, 2019

(30) Foreign Application Priority Data

Oct. 12, 2017   (FR) ...................................... 1759539

(51) Int. Cl.
*A61C 5/77*   (2017.01)
*A61C 13/30*   (2006.01)
(Continued)

(52) U.S. Cl.
CPC .................. *A61C 5/77* (2017.02); *A61C 5/50* (2017.02); *A61C 5/73* (2017.02); *A61C 13/30* (2013.01);
(Continued)

(58) Field of Classification Search
CPC .... A61C 5/30; A61C 5/35; A61C 5/50; A61C 5/55; A61C 5/77; A61C 13/30; A61C 13/34; A61C 5/73
See application file for complete search history.

(56) References Cited

U.S. PATENT DOCUMENTS 3,962,787 A   6/1976   Corbett
2002/0025506 A1*   2/2002   Hagenbuch ............ A61C 13/30
433/201.1
(Continued)

FOREIGN PATENT DOCUMENTS

DE   3825601 A1   3/1989
EP   0432001 A1   6/1991
(Continued)

OTHER PUBLICATIONS

"Gold, Au". Accessed at http://www.matweb.com/search/DataSheet.aspx?MatGUID=d2a2119a08904a0fa706e9408cddb88e on Jun. 3, 2021 (Year: 2021).*

(Continued)

*Primary Examiner* — Edward Moran
(74) *Attorney, Agent, or Firm* — Oliff PLC

(57) ABSTRACT

A crown and root dental restoration includes a prosthesis having at least one through canal having one end opening into at least one root canal and opening into an outer face of the restoration, the through canal forming with the root canal a cavity extending along a first direction; reinforcement pins arranged in the root canal and the through canal, at least one reinforcement pin connecting the through canal with the root canal, the reinforcement pins having a length smaller than a total height of the through canal and a dental root; and a glue filling the root canal and the through canal, the glue contacting sidewalls of the through canal, sidewalls of the root canal, and sidewalls of each reinforcement pin.

15 Claims, 10 Drawing Sheets

(51) Int. Cl.
*A61C 5/73* (2017.01)
*A61C 5/50* (2017.01)
*A61C 8/00* (2006.01)
*A61C 9/00* (2006.01)
*A61C 13/00* (2006.01)

(52) U.S. Cl.
CPC .......... *A61C 8/0012* (2013.01); *A61C 8/0018* (2013.01); *A61C 9/004* (2013.01); *A61C 13/0013* (2013.01)

(56) References Cited

U.S. PATENT DOCUMENTS

| | | |
|---|---|---|
| 2003/0148247 A1 | 8/2003 | Sicurelli et al. |
| 2007/0072153 A1* | 3/2007 | Gross .................. A61N 5/0603 433/224 |
| 2008/0032266 A1* | 2/2008 | Harlass .................. A61C 13/30 433/219 |

FOREIGN PATENT DOCUMENTS

| | | |
|---|---|---|
| EP | 2937062 A1 | 10/2015 |
| FR | 948779 A | 8/1949 |
| FR | 2588181 A1 | 4/1987 |
| FR | 2753365 A1 | 3/1998 |
| JP | 2015-198885 A | 11/2015 |

OTHER PUBLICATIONS

"Quartz (SiO2)". Accessed at http://www.matweb.com/search/datasheet.aspx?matguid=8715a9d3d1a149babe853b465c79f73e&n=1&ckck=1 on Jun. 3, 2021 (Year: 2021).*

* cited by examiner

CROWN AND ROOT DENTAL RESTORATION, METHOD FOR PERFORMING ONE SUCH RESTORATION AND METHOD FOR ETCHING ONE SUCH DENTAL RESTORATION

FIELD OF THE INVENTION

The invention relates to a method for performing a crown and root restoration, to a crown and root restoration and to a method for etching one such crown and root restoration.

STATE OF THE ART

In dentistry, and in particular in endodontics, when crown and root dental restorations are performed, and in particular to reconstruct the crown part of a tooth, the root part of the tooth is first of all shaped by drilling. Drilling is performed by means of rotary or cylindrical-conical ultrasonic instruments.

After shaping, a post is generally inserted and sealed in the root canal to act as retention for a crown restoration. To provide a good strength, the post has to penetrate up to the apical third of the root.

The root canals are hermetically sealed with specific materials, such as for example cylindrical-conical cones made from gutta-percha, or resins in the form of bi-component preparations.

In a conventional embodiment illustrated in FIG. 1, the crown and root restoration is totally formed by a compact material which can be a metal or a mineral equivalent, for example ceramic and in particular zircon.

The crown and root restoration comprises a prosthesis 1 made from compact material which is totally manufactured in a dental laboratory or in a machining shop.

The prosthesis 1 is produced by stratification, investment casting or injection, stereo-lithography or machining. The prosthesis 1 is monoblock in its crown part, chamber part, and at least in its canal and root part. The prosthesis 1 also comprises a chamber part and a root canal retention which are also made from a compact material, i.e. rigid and presenting a great hardness.

Once the different parts of the prosthesis 1 have been produced, the latter are assembled. When the crown and root dental restoration comprises a single root canal retention, the restoration is monoblock as from the time of manufacture in the laboratory. The restoration is sealed in the root canal and on the crown base to form the crown and root reconstruction.

Depending on the configurations, fixing of the crown part is performed using one or more root canal retention pins. In particularly advantageous manner, retention is performed using at least two divergent root channels 2.

In a first embodiment illustrated in FIG. 1, the monoblock prosthesis 1 comprises a crown part and a first post 1' designed to form a root canal retention. The crown part defines a straight through canal 3 which is configured to allow insertion of a second root canal retention which will be inserted in a second root canal 2. The second root canal retention is formed by a reinforcement structure A made from the same material as the prosthesis 1.

Fixing of the prosthesis 1 is achieved by filling the root canals 2 and the through canal 3 of the prosthesis 1 with a glue 9. It is clearly apparent that this crown and root restoration configuration requires the pulp chamber 5 and especially the root canals 2 to be freed first to make the impression of the crown part, of the chamber part and of the additional retention pin 4 which has to be inserted in the through canal 3 and in the second root canal 2.

It is apparent that, as the prosthesis 1 is exclusively made from rigid materials, it is not possible to manufacture retention pins that are curved or of any other shape, as the latter will not be able to be inserted in such a way as to follow the anatomy of the different root canals 2 used for retention.

With this technique, it is necessary to shape the root canal 2, i.e. to modify its initial shape by drilling in order to normalize its shape with respect to that of the posts 1' and 4.

The canal 2 is however often of irregular shape, for example of flattened, oval or figure-of-eight cross-section. The canal can be extremely tapered in its crown part and of oval cross-section. The canal can also be curved and off-centre, and it is also possible for the roots to be flat or concave. In order to fix the post 1' or 4 in the root canal 2 thereby forming the retention, it is necessary to widen out the canal 2 and to rectify its path.

Fitting of the post may be dangerous as preparation of the housing by mechanical drilling requires circular preparations to be performed with displacement of the root canal to the side of the curve. This results in a weakening of the canal wall and a large risk of brittleness and perforation of the canal 2.

In addition, as a maximum contact is sought to be achieved between the post and the canal walls, it is also necessary to attempt to limit dentin mutilation. A trade-off then has to be made between the use of drill bits of large diameter, which increases the risk of perforation, and the use of a drill bit of reasonable size, but which means that the post will not have any contacts with the non-instrumented areas which may result in poor adhesion and/or a poor transmission of stresses.

It has been observed that the pulp chamber of a bottom molar in certain cases has a parallelepiped rectangular shape. All of the mesial roots are curved and present a concaveness of the distal wall, and 99% of the molars present a concaveness of the mesial wall. The upper premolars have a mesial concaveness and frail roots. The canal is of oval or figure-of-eight cross-section in its first coronal third. The only straight part of the canal is generally situated in the first coronal third of the root and the canal is tapered with a flattened cross-section. When using a rigid post, the shape of the root canals has to be systematically reworked.

Rectification of the canal 2 to normalize it to match the shape of the post 1' or 4 and to straighten it therefore reduces the strength of the dental root. In the case of a crown and root dental restoration using rigid material, straight drilling of the root canals is presented as an uncircumventable method with the consequence of weakening of the dental root.

An alternative approach is presented in the document U.S. Pat. No. 5,915,970 where the crown and root restoration comprises a flexible post associated with a spacer. The spacer can be flexible and/or shock-resistant. The restoration also comprises a core which covers the post and spacer. The core is finally covered by the crown. The crown is made from rigid material to withstand mastication forces. The post can be formed by flexible pins or fibres which are twisted on one another or by a rigid pin.

The core is a standardized part which can be fitted at the same time as the post. This manufacturing method is particularly difficult to implement as it means that the root canal has to be filled with the post and the core then has to be fitted or adjusted. Then the cover has to be fitted and adjusted on the latter to match the configuration defined by the core. Finally, the crown is fitted on the core. The arrangement of the core is strongly linked to the shape of the root canal, which complicates fitting of the cover which has to be customized. This also complicates fitting of the crown.

Faced with the complexity of this manufacturing method, a different approach illustrated in FIG. 2 has been proposed where the root canal 2 is worked and shaped in order to be able to fit a rigid post 4 in the canal. As indicated in the foregoing, as the post 4 is made from rigid material, the shape of the root canal 2 has been modified in order to be able to fit the post 4 therein. The dental practitioner therefore has to widen the canal 2 and rectify its path. Fitting of the post 4 may therefore be dangerous. As indicated in the foregoing, preparation of the housing of the post 4 by mechanical drilling requires circular reparations with displacement of the canal 2 to the side of the curve, weakening of the canal wall and a large risk of brittleness and perforation.

Once the post 4 has been fitted, the rest of the crown and root restoration is performed using composite materials 6 inserted in plastic phase and subsequently polymerized. This operation is performed without the assistance of a dental laboratory or machining shop, but it is lengthy and requires a certain experience.

Furthermore, the materials 6 used to form the crown part of the restoration are materials that are less rigid and of lesser strength than the post 4 which is generally made from metal or from ceramic. The risk of weakening or deterioration of the restoration is greater than for a restoration using ceramic or metal. Furthermore, as the most rigid area of the restoration is inserted in the root, the stresses are induced deeply which increases the risk of deterioration of the root canal 2 and complicates or even prevents any subsequent repair work. Such a teaching is presented in the documents FR2588181, U.S. Pat. No. 4,936,776, DE3825601 and EP0432001. The posts 4 present a finished shape that is straight cylindrical or cylindrical-conical and a rigid structure.

As an alternative, the document FR-A-2753365 describes an endo-canal post. The post is formed by a core coated with sheaths. The core made from composite material is semi-rigid and flexible: it is composed of an organic matrix reinforced by fibres. The sheaths are made from composite material pre-impregnated with resin and are in a pasty pre-polymerization state.

An improvement of these methods has been proposed in the document FR 3020264. The document describes the use of a reinforcement structure A formed by a plurality of micro-posts 7 secured to one another by an assembly means 8.

The root canal 2 is unstopped and micro-posts 7 illustrated in FIG. 3 are inserted in the canal 2 in the form of one or more bundle of micro-posts. The rest of the restoration is performed by means of materials 6 inserted in plastic phase to form the crown part. The root canal 2 is also filled with a glue or a resin. Such an embodiment is illustrated in FIG. 4.

Before and during its insertion in the root canal 2, the reinforcement structure is flexible and malleable. The glue is then polymerized as required by cross-linking means to change to a second polymerized state.

This type of reinforcement means that less drilling of the canal 2 is required, thereby reducing the risks of weakening or perforation of the canal walls.

This solution results in less stress on the root canal 2, but it does not enable a restoration to be formed that is as solid as its ceramic equivalent as the volume occupied by the micro-posts 7 is limited to the cone constituted by the canal opening.

OBJECT OF THE INVENTION

One object of the invention is to remedy the shortcomings of the prior art, and in particular to propose a method for manufacturing a crown and root restoration possibly on a laboratory model that is easy to implement and that enables a more solid restoration to be achieved without introducing an excessive set of constraints in the root canal.

This object tends to be achieved by means of a method for performing for a crown and root dental restoration comprising:

Making an impression of the pulp chamber to define the crown part of the reconstruction, the pulp chamber opening into at least one filled root canal;

Producing a prosthesis from the impression, the prosthesis comprising at least one through canal, said at least one through canal having an end opening onto said at least one root canal;

Unstopping said at least one root canal;

Filling said at least one root canal and said at least one through canal with a glue;

Fitting the prosthesis so that said at least one through canal opens onto said at least one unstopped root canal, Inserting a plurality of reinforcement pins in said at least one root canal through said at least one through canal, said at least one through canal and said at least one root canal being filled by the plurality of reinforcement pins and the glue.

In one development, the at least one through canal is curved or has a variable cross-section in its lengthwise direction.

In a particular embodiment, said at least one root canal is unstopped without drilling the side wall of said at least one root canal.

In advantageous manner, the plurality of reinforcement pins is inserted in the form of a bundle of pins fixed to one another by an assembly means.

Preferentially, the assembly means is configured to group the plurality of reinforcement pins so as to form the bundle of pins, said assembly means partially covering the length of the reinforcement pins.

In an advantageous embodiment, at least one bundle of pins comprises an additional pin made from a material that can be etched more quickly than the plurality of reinforcement pins so as to form an etching canal.

It is advantageous to provide for the assembly means to be configured to group the plurality of reinforcement pins and the additional pin so as to form the bundle of pins. The assembly means partially covers the length of the reinforcement pins, the additional pin being fixed directly or indirectly to the assembly means between the reinforcement pins.

In an advantageous embodiment, the additional pin is fixed to the adjacent reinforcement pin over at least 70% of its length.

In another development, the bundle of pins comprises from 3 to 15 reinforcement pins and/or the reinforcement pins of the plurality of reinforcement pins have diameters ranging from 0.1 mm to 0.5 mm.

Advantageously, the method comprises an additional step of polymerization of the glue after insertion of the reinforcement pins in said at least one root canal and said at least one through canal.

Preferentially the method comprises marking at least one root canal in the pulp chamber, before the impression of the pulp chamber is made, marking of the root canal being advantageously performed by making an indenture at the entry of the root canal.

In a particular embodiment, before the polymerization step, a second reinforcement structure is deposited next to the first reinforcement structure, the second reinforcement structure being devoid of an etching canal and the first reinforcement structure being located in the centre of the dental canal.

It is further object of the invention to perform a crown and root dental restoration eventually on a laboratory model that is simple to achieve and that improves the strength while limiting the set of constraints in the root canal.

This object tends to be achieved by means of a crown and root dental restoration on a laboratory model comprising:
  a prosthesis comprising at least one through canal, said at least one through canal having one end opening into at least one root canal;
  a plurality of reinforcement pins arranged in said at least one root canal and said at least one through canal so that one and the same reinforcement pin connects a through canal with a root canal,
  a glue filling the root canal and the through canal.

The dental restoration is remarkable in that the prosthesis is made from a material having a higher Young's modulus than the Young's modulus of the plurality of reinforcement pins and than the Young's modulus of the glue.

In one development, the plurality of reinforcement pins is inserted in the form of a bundle of pins fixed to one another by an assembly means. At least one bundle of pins comprises an additional pin made from a material that is able to be etched more quickly than the plurality of reinforcement pins so as to form an etching canal.

It is a further object of the invention to provide a method for opening a crown and root dental restoration, possibly on a laboratory model, that is simple to perform and that facilitates access to the apical part of the dental canal once the restoration has been performed.

This object tends to be achieved by means of a method comprising the following steps:
  Etching the etching canal by means of a drill bit using at least one reinforcement pin of the reinforcement structure as guide for penetration of the drill bit.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF A PREFERRED EMBODIMENT OF THE INVENTION

In order to provide a crown and root restoration presenting an enhanced strength with ageing, the inventors observed that it is particularly advantageous to have a crown part and advantageously a chamber part made from a rigid material and a root retention made from a less rigid material. In advantageous manner, the crown part is made from an isotropic material and the root retention is formed from an anisotropic material.

It has also become apparent that it is particularly advantageous to have a root retention that is formed by a plurality of reinforcement pins inserted in a glue. The reinforcement pins are made from a flexible material which enables the pins to follow the shape of the root canal without having to reshape the latter as is the case when a single rigid post is used, for example a post made from metal or from ceramic.

In particularly advantageous manner, the reinforcement pins are released from their securing sheath and reorganized in homogenous manner in the unstopped root canal opened up by means of a suitable instrument, for example a dental probe.

Figure 5:
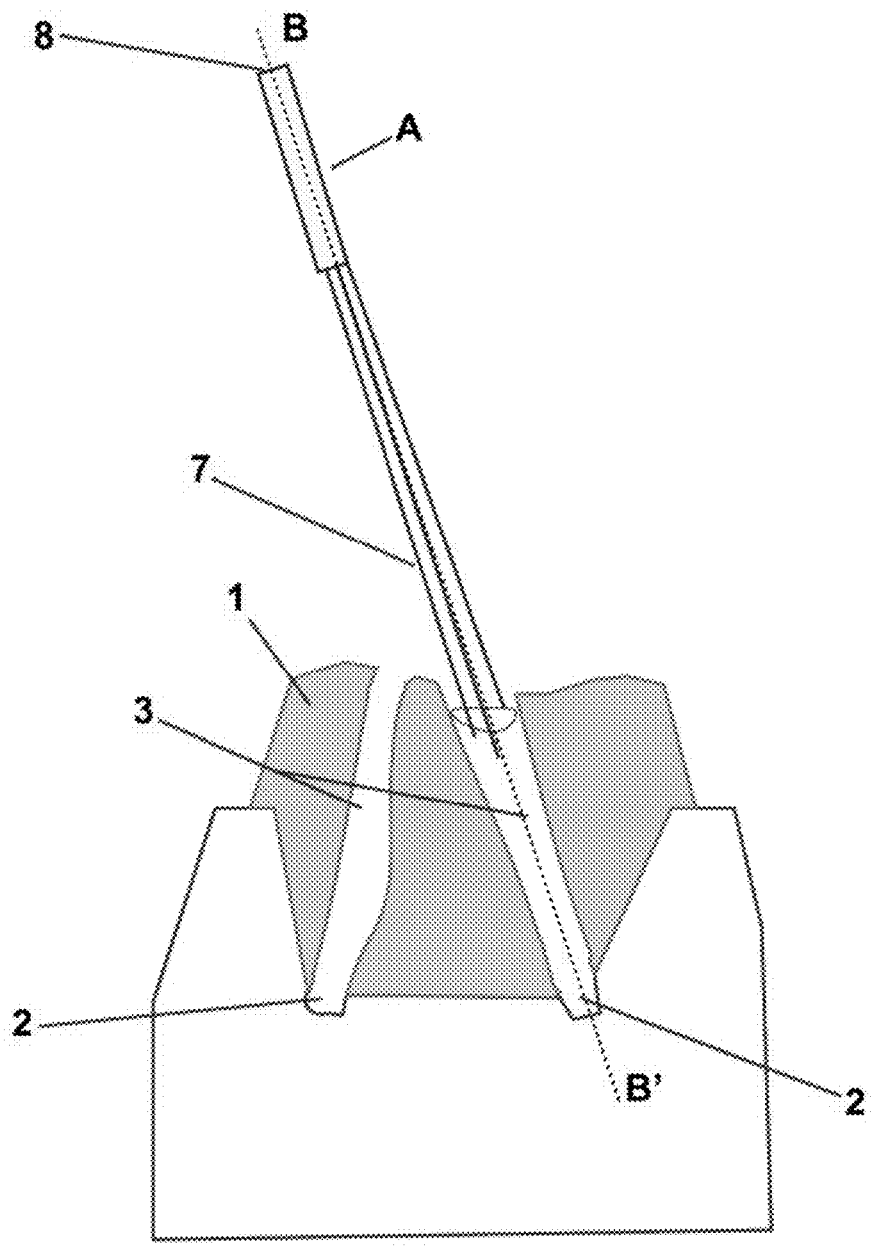
FIGS. 5, 6, 7, 8, 9 and 10 represent consecutive steps of a method for performing a crown and root restoration according to the invention, in schematic manner.
Figure 10:
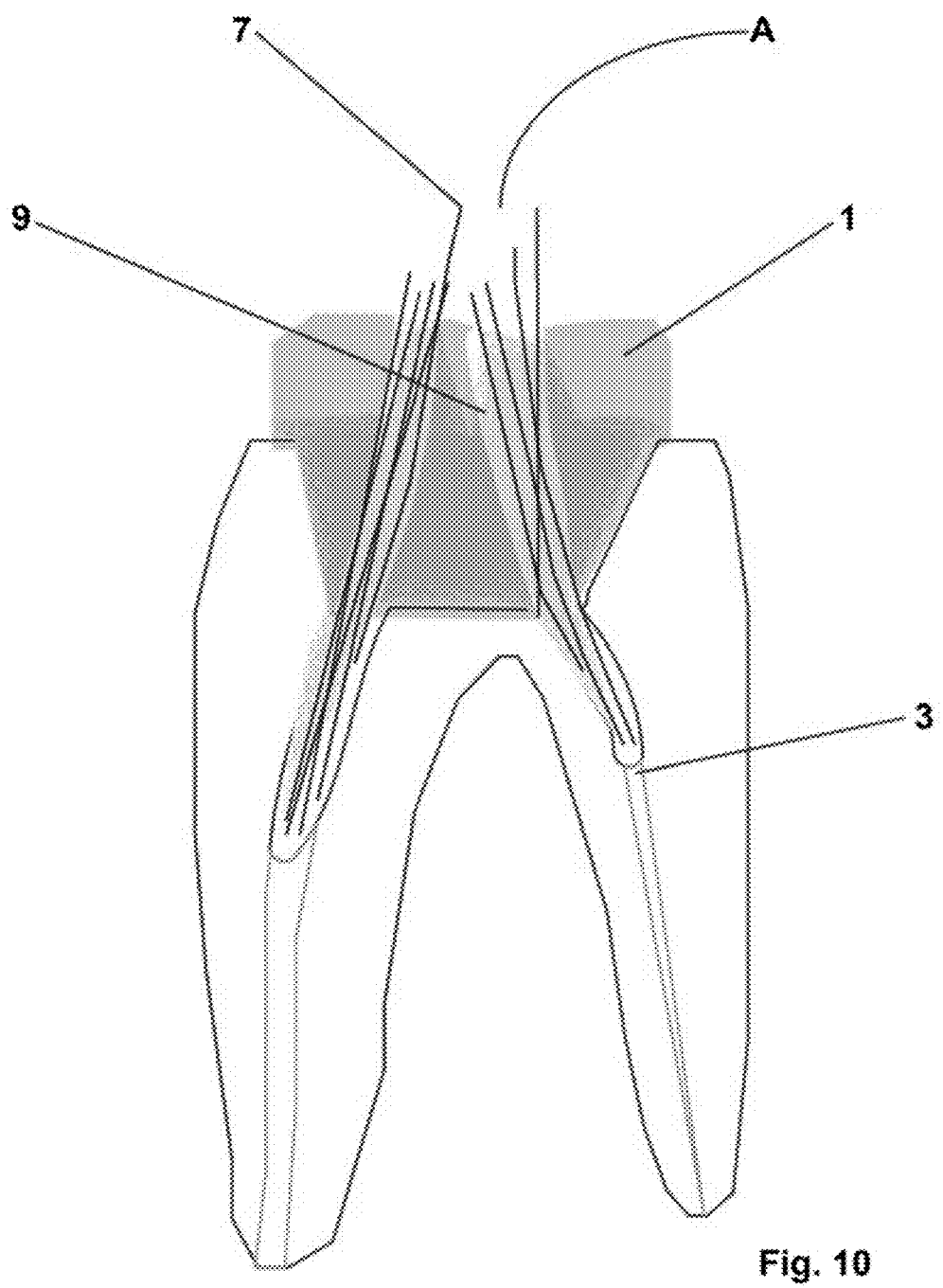

As illustrated in FIG. 5 and in FIG. 10, it is particularly advantageous to provide a crown and root dental restoration which has a prosthesis 1 comprising at least one through canal 3. The at least one through canal 3 has one end opening into at least one root canal 2. In this way, it is possible to fit one or more reinforcement pins 7 which make the mechanical connection between the root canal 2 and the through canal 3 of the prosthesis 1.

The dental restoration comprises a reinforcement structure A formed by plurality of reinforcement pins 7 arranged in said at least one root canal 2 and said at least one through canal 3 so that a reinforcement pin 7 connects a through canal 3 with a root canal 2.

The dental restoration comprises a glue 9 filling the root canal 2 and the through canal 3. The glue 9 will provide the chemical and mechanical bond between the canal wall and the reinforcement pins 7 and also the chemical and mechanical bond between the reinforcement pins 7 and the prosthesis 1. The glue 9 will also perform securing of the prosthesis 1 with the walls of the pulp chamber 5.

The prosthesis 1 is made from a material having a higher Young's modulus than the Young's modulus of the glue 9 and possibly higher than the Young's modulus of the plurality of reinforcement pins 7. In this way, the stresses applied on the top part of the restoration are retransmitted to the root canal 2 through the reinforcement pins 7 and the glue 9. As these materials are less rigid, the risks of deterioration of the root canal 2 are greatly reduced. In an advantageous embodiment, the prosthesis 1 is made from a material which presents a flexural strength greater than or equal to 300 MPa and a modulus of elasticity greater than or equal to 80 Gpa. The prosthesis can be made from a material which is for example a ceramic, such as zircon, a metallic material or a powdery material consolidated by sintering.

For example purposes, it is possible to use a zircon marketed under the name of Katana by the Kuraray Company. This zircon has a Young's modulus comprised between 130 MPa and 150 Mpa and a modulus of elasticity equal to 95 GPa. This zircon can present a flexural strength comprised between 300 MPa and 1200 MPa, preferably between 300 MPa and 700 MPa.

Furthermore, in order to ensure a good retransmission of the forces between the crown part made from rigid material and the root part, it is particularly advantageous to provide for the reinforcement pins 7 to be present over at least 50% of the height of the prosthesis 1. In even more preferential manner, the reinforcement pins 7 are present over at least 80% of the height of the prosthesis.

In a preferential embodiment, to enhance proper transmission of the stresses, the volume occupied by the reinforcement pins 7 is at least equal to the volume occupied by the glue 9 in the through canal 3 of the prosthesis 1. The same can be the case in the root canal 2.

In this configuration, the prosthesis 1 made from rigid material presses on the side walls of the pulp chamber 5 as is the case with a healthy tooth. The stresses are therefore better distributed on the cervical and chamber part of the root which prevents too great stressing of the root canals 2.

The canals 2 are also stressed in order to achieve a mechanical strength that is closer to the sensations procured by a healthy tooth.

This innovating configuration can be implemented by means of a method which is also innovating.

The crown and root restoration method comprises a plurality of technological steps.

In a first step, an impression of the pulp chamber 5 has to be taken to form the crown and chamber part of the restoration, the pulp chamber 5 opening onto at least one stopped root canal 2. In methods according to the prior art, the canal was emptied and if necessary reworked in order to be able to match the shape of the post defined in the prosthesis or acting as a retention means.

In the present case, the root canal or canals 2 are stopped, and advantageously the stopping has hitherto never been removed. In this way, the shape of the impression is closer to the impression of the tooth to be replaced which facilitates acceptance of the future prosthesis 1 with respect to the initial tooth.

Furthermore, when an impression is taken according to the prior art, prior unstopping of the canals results in the formation of a retention area for the material used to define the impression, for example silicone. The latter deforms or tears so that the impression, and therefore the resulting laboratory model, comprises inaccuracies detrimental to obtaining a perfectly adjusted and passive prosthesis. This point is particularly important as a non-passive prosthesis is constantly the cause of breaks and cracks in the crown dentin.

This also enables less stress to be placed on the root canals 2 by avoiding emptying them a first time to take the impression, and then filling them again during the manufacturing period of the prosthesis 1 to then stress them once again when the prosthesis 1 is fitted. The risks of infection linked to the waiting phase for manufacture of the prosthesis 1 to be completed are thus prevented.

For ease of forming a through canal 3 which opens out facing the entry of a root canal, it is advantageous to mark the root canal 2 in the pulp chamber 5. Marking of the root canal 2 is advantageously performed by an indenture at the entry of the root canal 2, before the impression of the pulp chamber 5 is made. The indenture can be obtained by means of a round bur or a similar bur or by any other means able to define the indenture.

A prosthesis 1 is manufactured from the impression. The prosthesis 1 comprises at least one through canal 3. Depending on the embodiments, the prosthesis 1 comprises one or more through canals 3. In the exemplary embodiment illustrated, the prosthesis 1 comprises two through canals 3. Each through canal 3 has one end which opens onto a root canal 2.

As illustrated in FIG. 5, it is particularly advantageous to have a through canal 3 which opens onto a root canal 2 in order to be able to insert a plurality of reinforcement pins 7 which will perform transmission of the stresses between the prosthesis 1 and canal 2.

Figure 6:
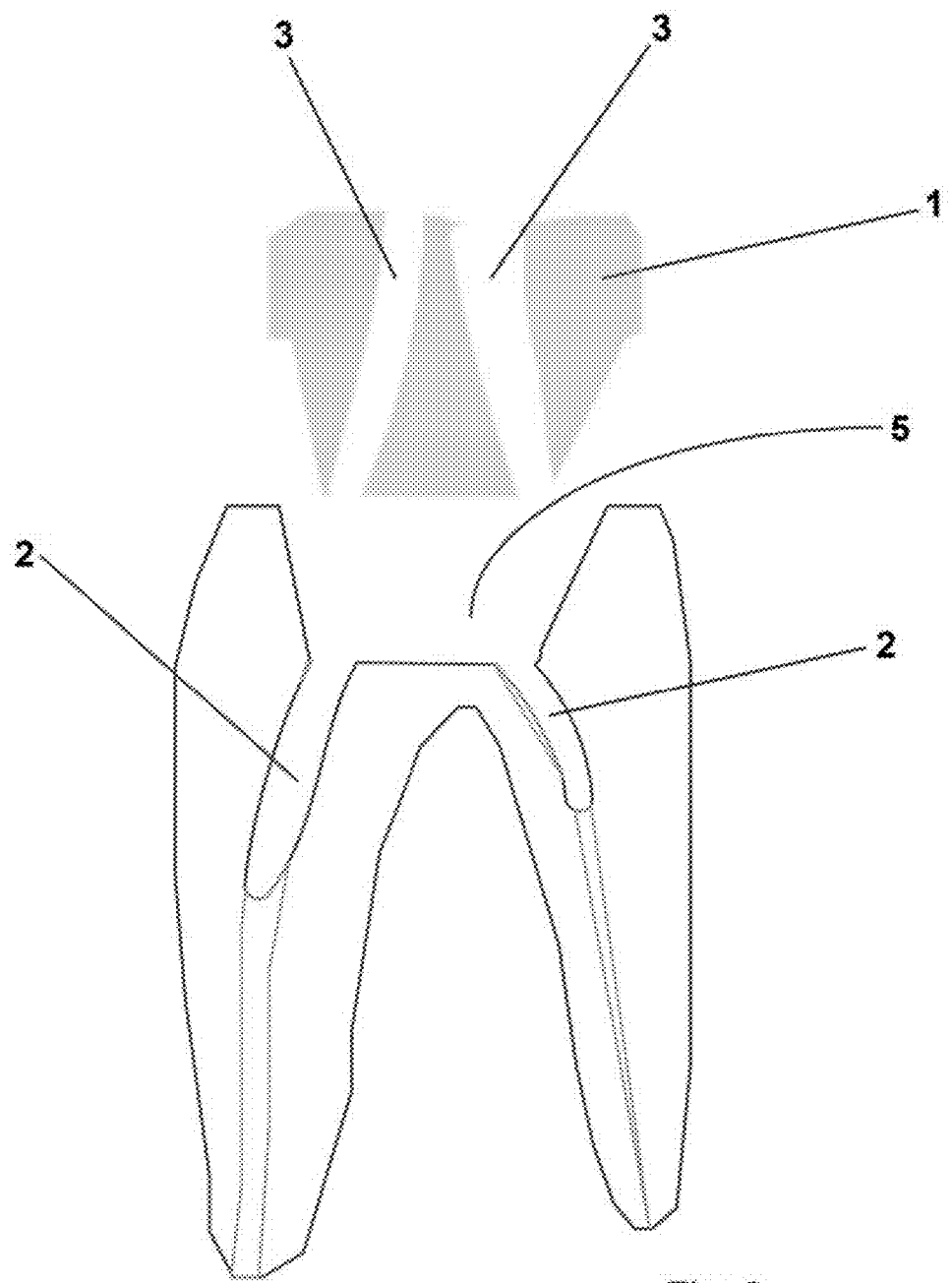

As illustrated in FIG. 6, once the prosthesis 1 is ready, it is particularly advantageous to unstop the root canal 2. The root canal 2 is thus prepared at the last moment, preventing any risk of infection that may be caused by the time required to complete the manufacturing phase.

Figure 7:
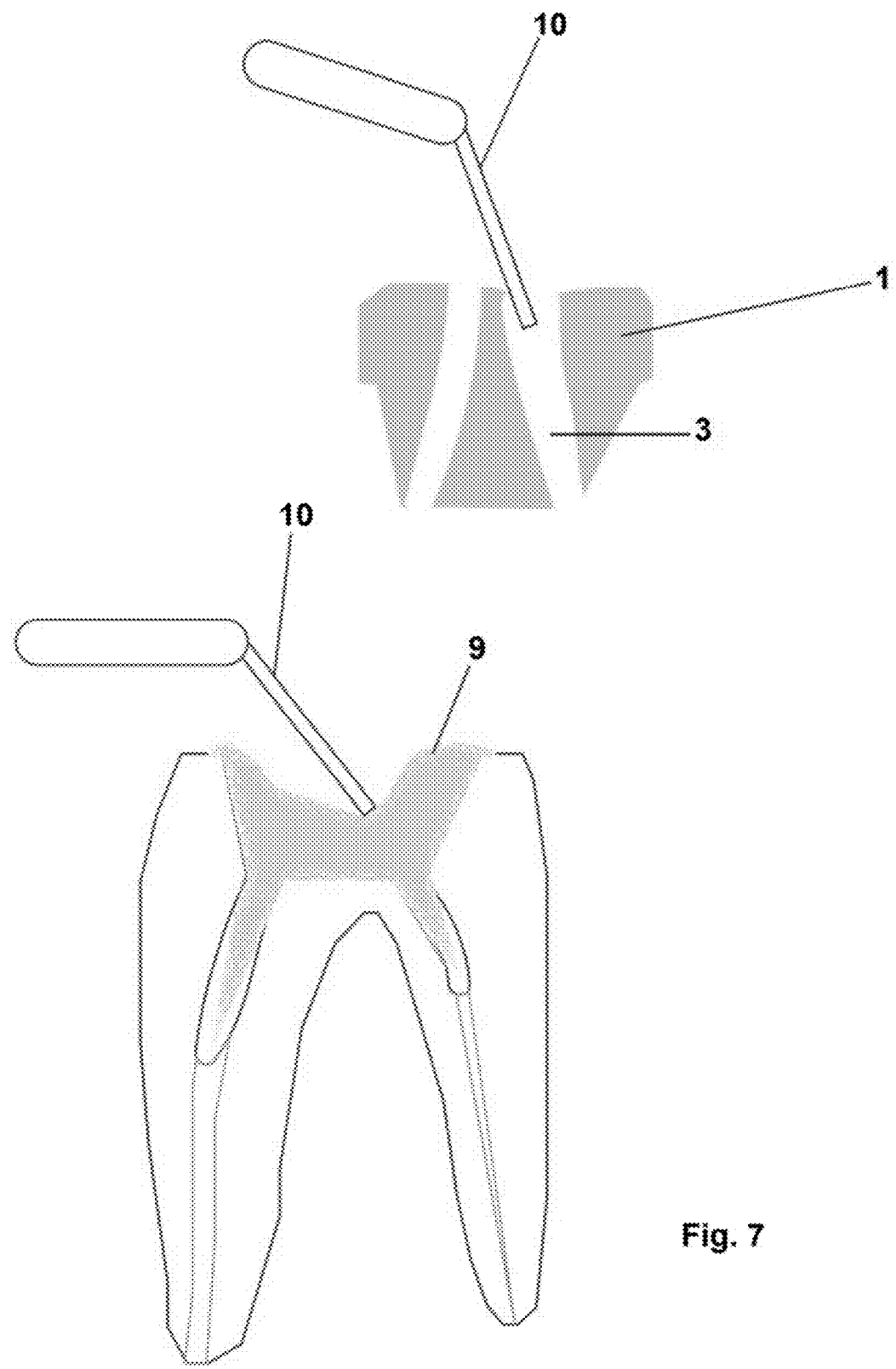

As illustrated in FIG. 7, the root canal 2 and through canal 3 are filled with a glue 9. Depending on the embodiments, the root canal 2 and through canal 3 are filled with the same glue or with different glues in order to better accommodate the stresses. For example, the glue 9 is inserted by means of a cannula 10. In the embodiment illustrated in FIG. 7, the prosthesis 1 is dissociated from the pulp chamber 5 when insertion of the glue 9 takes place. However, it is also possible to provide for the pulp chamber 5 and roots 2 to be filled with glue 9 and for the prosthesis 1 to be subsequently inserted with a possible addition of glue 9 in the through canals 3.

In a particular embodiment, it is possible to use a glue 9 to make the connection between the side walls of the prosthesis 1 and the side walls of the pulp chamber 5.

Figure 8:
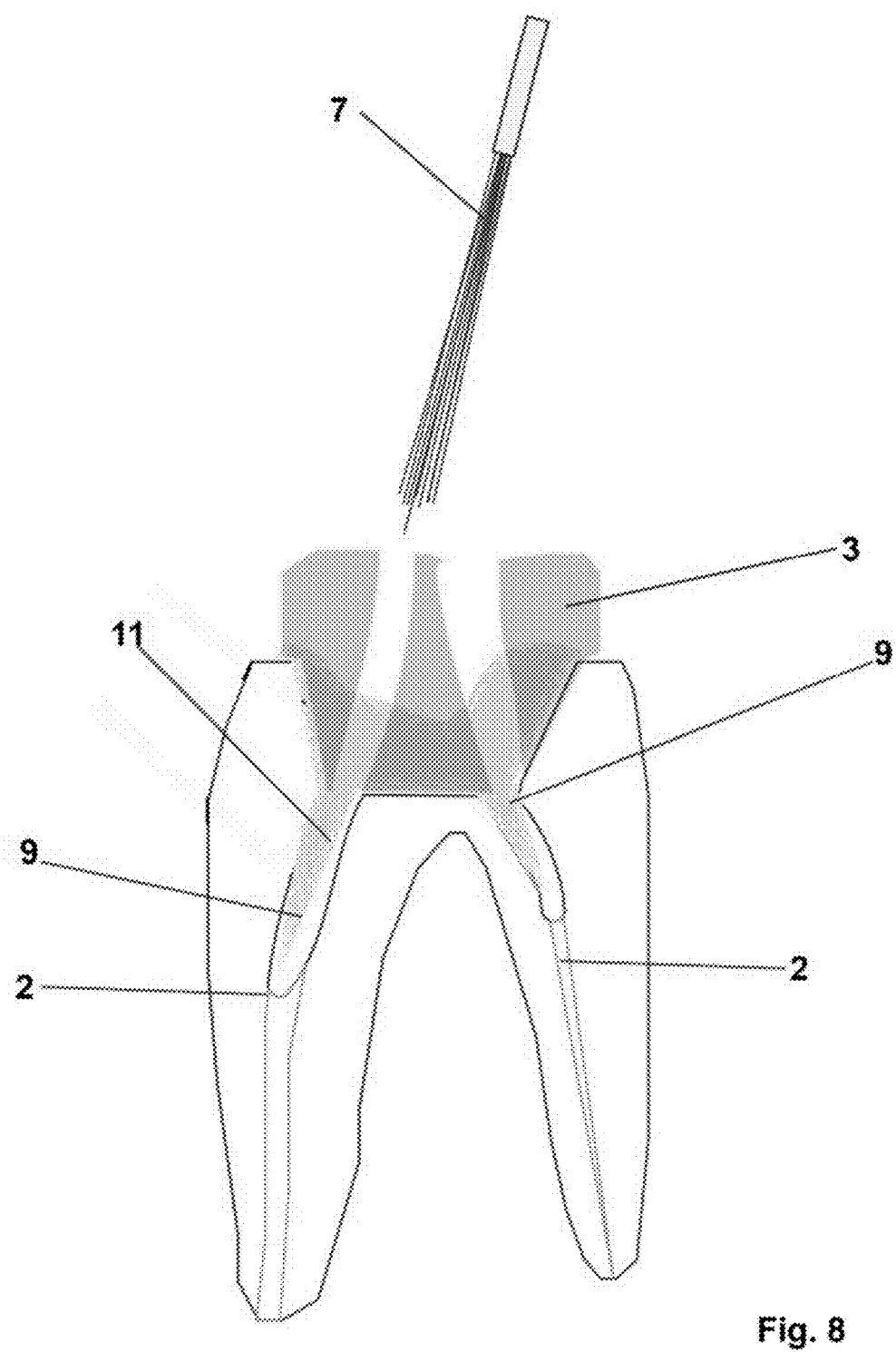

As illustrated in FIG. 8, the glue 9 performs the mechanical and chemical bond between the root canal 2 and the through canal 3. The glue 9 is in a state which allows subsequent insertion of the reinforcement pins 7.

Figure 9:
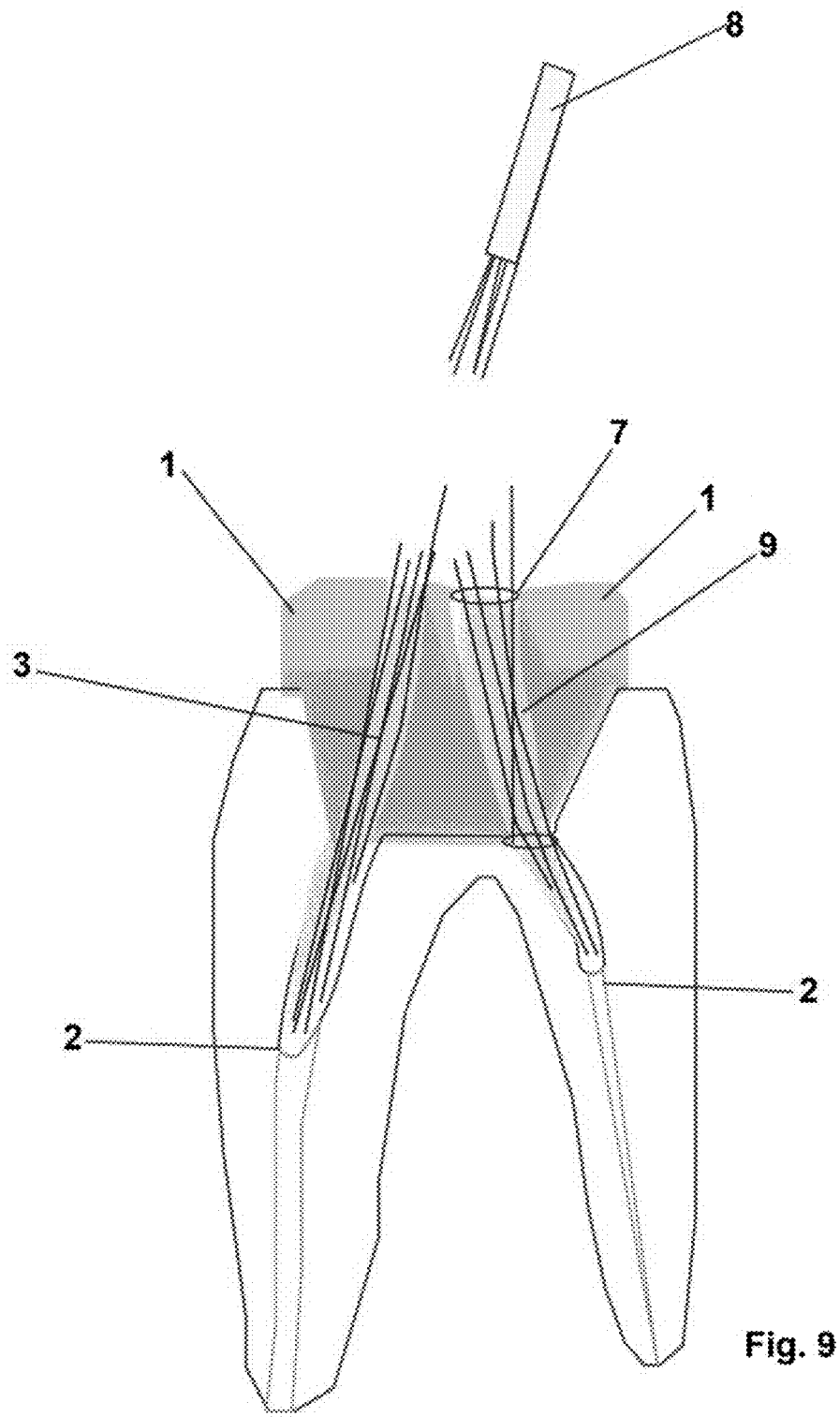

As illustrated in FIG. 9, once the prosthesis 1 and glue 9 are in place, the reinforcement pins 7 are inserted. It is particularly advantageous to insert the reinforcement pins from the side where the prosthesis 1 is located as the pins 7 will follow the through canal 3 until they reach the entry of the root canal 2. Continued pressing on the reinforcement pins 7 will result in the latter following the path defined by the root canal 2, whatever its shape.

It is particularly advantageous to provide for the through canal 3 to open onto the top part of the prosthesis 1 in order to facilitate insertion of the reinforcement pins 7.

The use of the reinforcement pins 7 made from a flexible material enables a straight through canal 3 of constant cross-section to be used as illustrated in FIGS. 5 to 10. However this also makes it possible to use a curved through canal 3 and/or a through canal 3 of any cross-section and which can vary in the longitudinal direction of the through canal 3. The reinforcement pin 7 will deform in order to follow the path defined by the canals.

This configuration enables the constraints on the manufacturing methods of the prosthesis 1 to be lifted. When the through canal 3 is not straight and of constant cross-section, the methods of the prior art meant that the through canal 3 had to be machined or a new prosthesis 1 had to be remanufactured.

The use of curved through canals 3 enables the point of entry of the reinforcement pins 7 in the top part of the prosthesis 1 to be displaced thereby enabling insertion of the pins in an area that is easier for the dental practitioner.

As the glue 9 is in viscous or liquid state in the through canal 3 and in the root canal 2, it does not hamper the progression of the reinforcement pins 7.

In a particular embodiment, the root canal 2 is unstopped without deforming the side wall of the root canal. This embodiment enables the original anatomy of the root canal 2 to be preserved.

It is advantageous to provide for the plurality of reinforcement pins 7 to be inserted in the form of a bundle of pins secured to one another by an assembly means 8. This configuration facilitates insertion of the multiple reinforcement pins 7 which are used to fill the canals. Each canal can be filled by a bundle of reinforcement pins 7 or by a plurality of bundles of reinforcement pins 7 also called reinforcement structure A.

After insertion of the multiple reinforcement pins 7, and before polymerization of the glue 9, it is advantageous to separate the assembly means 8 and the reinforcement pins. For example, separation is performed by severing of the reinforcement pins 7 or any other suitable method. It thereby becomes easier to arrange the reinforcement pins 7 in the required places in the volume of the through canal 3 and of the dental canal 2, to curve them individually or to perform translation of the selected reinforcement pins 7 so as to fill the volume of the through canal 3 and of the dental canal 2. A suitable tool such as a dental probe is used to perform this operation.

Figure 1:
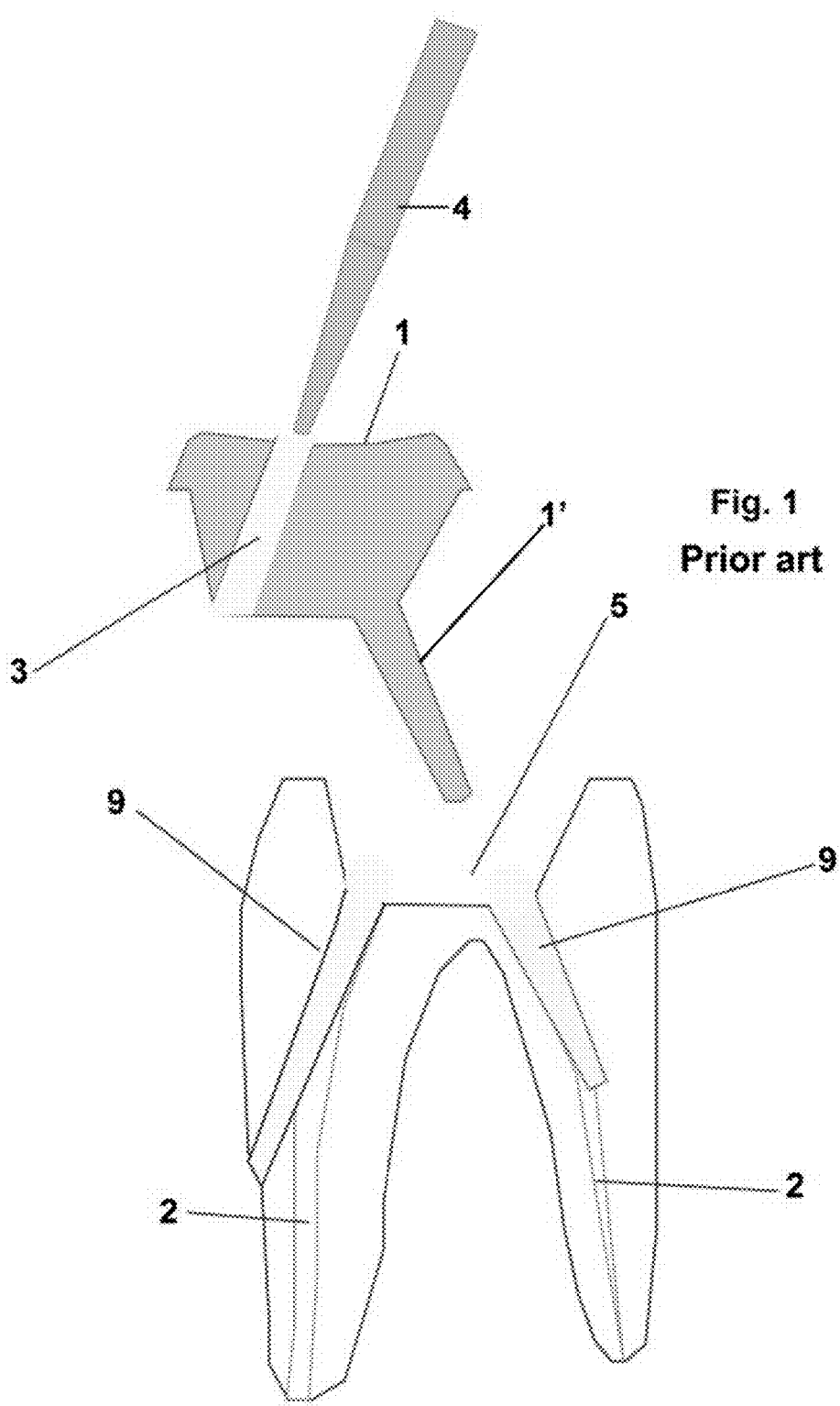
FIG. 1 represents a first embodiment of a crown and root dental restoration according to the prior art, in schematic manner, in cross-section.
Figure 2:
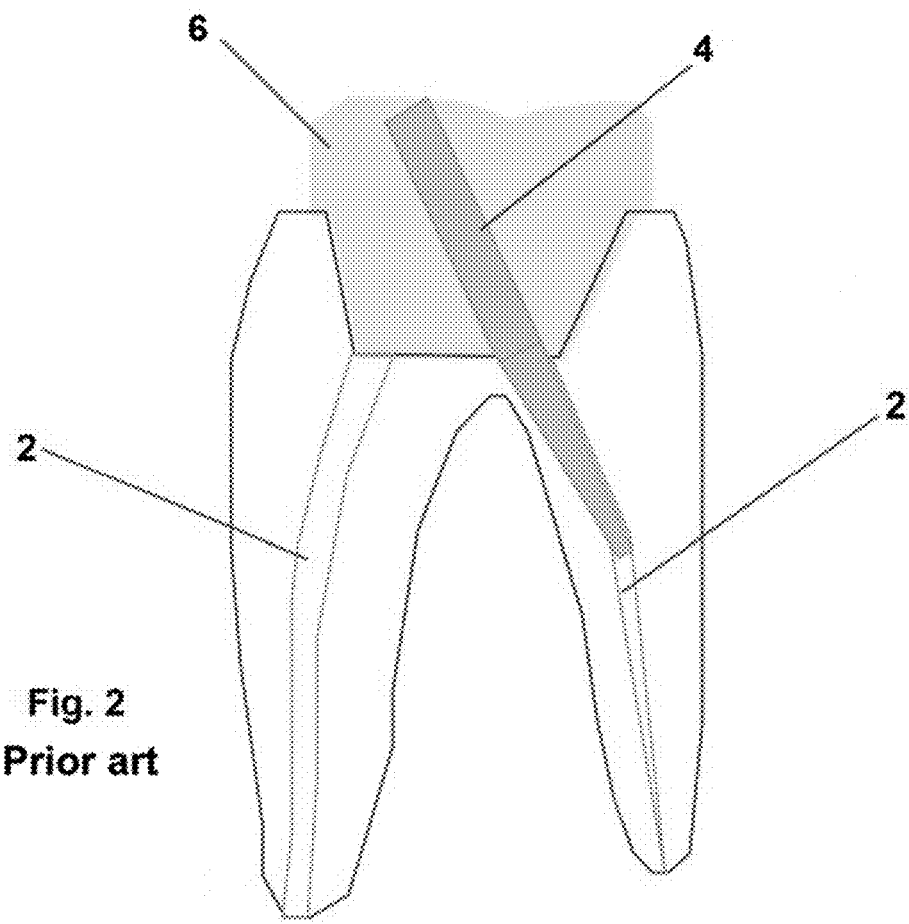
FIG. 2 represents a second embodiment of a crown and root dental restoration according to the prior art, in schematic manner, in cross-section.
Figure 3:
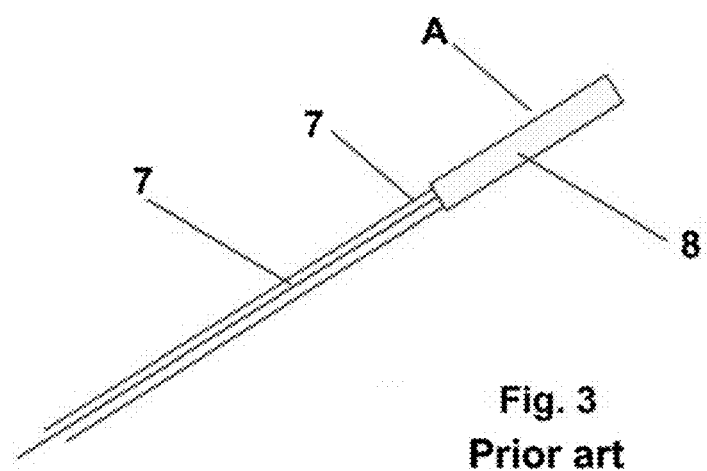
FIG. 3 represents a first embodiment of a reinforcement structure formed by micro-posts assembled in the form of a bundle according to the prior art, in schematic manner, in cross-section.
Figure 4:
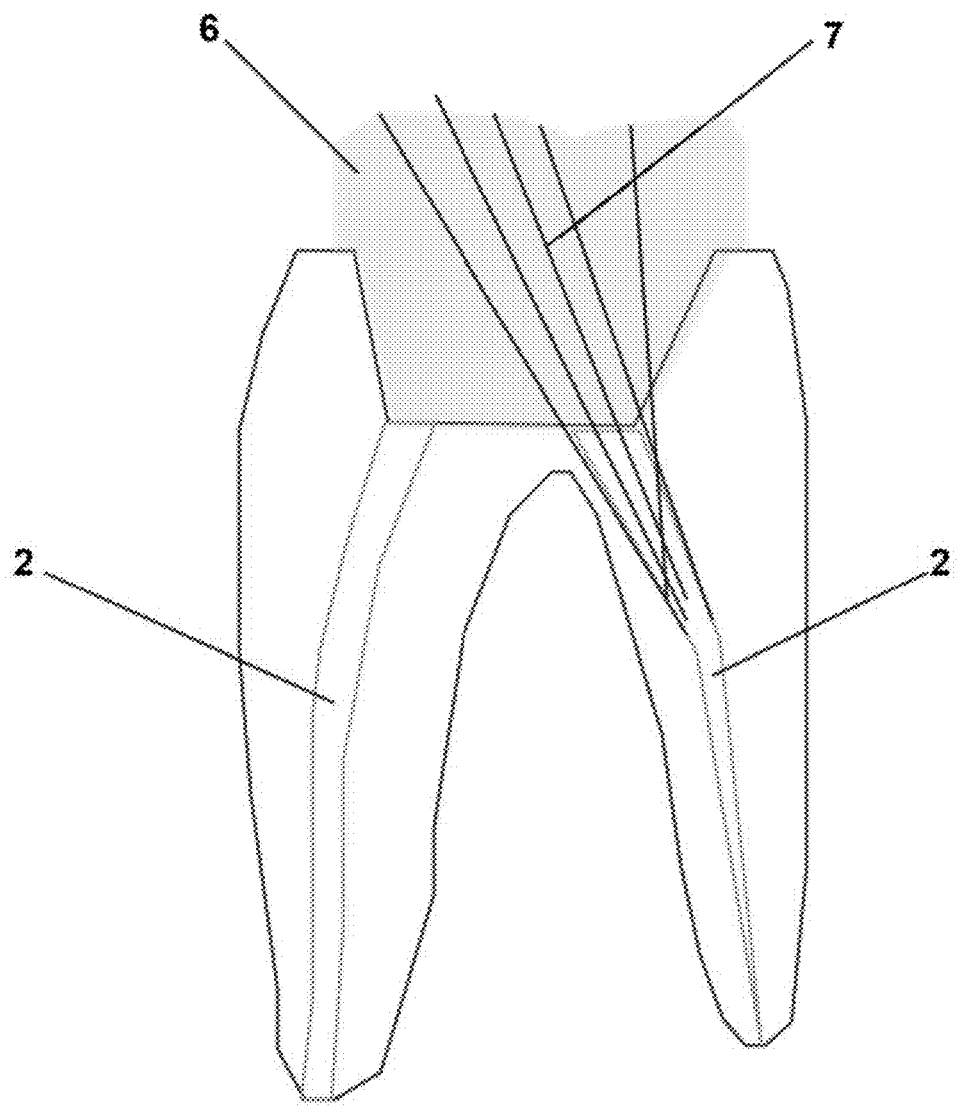
FIG. 4 represents a third embodiment of crown and root dental restoration according to the prior art provided with reinforcement pins in a polymer matrix, in schematic manner, in cross-section.

As illustrated in FIG. 3, the crown and root dental restoration comprises a prosthesis 1 which is associated with a reinforcement structure in the form of a bundle of pins 7. What is meant by bundle of pins 7 is a set of slender elongate elements attached together. The different pins are substantially parallel to one another and they are at least oriented in the same general direction.

The bundle comprises at least two pins 7. Preferentially, the bundle comprises from 2 to 15 pins, and even more preferentially from 3 to 15 pins, and even more preferentially from 3 to 5 pins. The number of pins 7 is advantageously inversely proportional to the diameter of the pins 7.

The pins 7 are advantageously of identical length. They thus form a bundle of homogenous shape. In an alternative embodiment, the pins 7 can be of different lengths, their ends being staggered.

The pins 7 are advantageously flexible so as to be able to be easily inserted in the root canal 2 and the through canal 3 and fit snugly with the complex morphology of the canals. What is meant by flexible is a malleable element which can be easily curved to follow the shape of the canals. In FIG. 5, the pins 7 are straight they are presented in schematic manner. In reality, as they are flexible, they can present a curved shape.

The pins 7 have a very small diameter. What is meant by small diameter is diameter less than or equal to 0.5 mm and advantageously comprised between 0.1 mm and 0.5 mm.

The pins 7 can thus be fitted in a large number of canal structures, even in very confined structures.

According to one embodiment, the pins 7 have an identical diameter, i.e. all the pins have approximately the same diameter to within 0.05 mm. According to another embodiment, the pins 7 have an increasing cross-section from the centre of the bundle to the periphery of the bundle.

For example, the pins can have an increasing diameter the closer they are to the centre of the reinforcement structure. For example, the diameter can be equal to 0.5 mm close to the centre and the pins in peripheral position can have a diameter of 0.3 mm.

According to another example, the bundle can be formed by two pins with a diameter of 0.5 mm, two pins with a diameter of 0.3 mm and two pins with a diameter of 0.15 mm.

The diameter of the pin can also vary over the whole of its length and the pin can have a geometry that is cylindrical-conical, staggered cylindrical, double conical or with a variable taper over its whole length.

According to another embodiment, the pins 7 can have a decreasing cross-section from the centre of the bundle to the periphery of the bundle.

The pins 7 are advantageously made from composite material: the pins 7 are formed by at least one fibre coated with a first polymer matrix. Preferentially, each pin 7 comprises several fibres arranged in the form of an assembly of fibres, the fibres being able for example to be twisted and possibly flocked, covered by a coating.

Advantageously, the first polymer matrix will be chosen by the person skilled in the art in order to enable a solid association of the fibres with one another to form a strong composite fibre pin.

The fibres are preferably unidirectional long fibres. The fibres of any one pin are coated in a polymer matrix. Each pin is formed by fibres coated in a polymer matrix. The pins are preferably totally polymerized individually so as to form flexible pins independent from one another.

The fibres act as reinforcement inside the pins, along their long axis (axis BB' of FIG. 5).

The fibres of the pins 7 can be of identical or different nature, within one and the same pin. The fibres can be of identical or different nature from one pin to the other.

Any sort of fibre can be used provided it has a surface coating compatible with the assembly resin used. The fibres can be artificial manufactured fibres, such as siliceous fibres, carbon fibres, or organic fibres (of poly(p-phenylene terephtalamide) (PPD-T), aramid, or nylon type etc.) or even natural fibres. Mineral fibres can also be used.

As represented in FIGS. 5 and 9, the pins 7 are assembled and mechanically connected by an assembly means 8. All the pins 7 are secured to one another by the assembly means 8. The assembly means 8 is configured to group the plurality of pins 7.

The assembly means 8 partially covers the length of the pins 7 and is configured to mechanically secure the pins together and to leave a part of the length of the pins 7 free.

The assembly means 8 is arranged in such a way that at least a half of the length of the pins 7 is not secured by the assembly means 8. In advantageous manner, the assembly means 8 is arranged in such a way that less than one third of the length of the pins 7 is not secured by the assembly means 8. In other words, the assembly means 8 covers less than one half of the length of the pins 7 and advantageously less than one third of the length of the pins 7.

The assembly means 8 is for example positioned in the first third of the length of the bundle of pins 7 so as to allow flexion of the pins 7 with respect to the assembly means and possibly flexion of one pin with respect to the other.

Preferentially, the assembly means 8 is arranged in one of the ends of the bundle of pins 7 so as to hamper the freedom of flexion of the pins 7 as little as possible. What is meant by end is that the assembly means 8 is positioned on the first quarter of the length of the pin.

The pins 7 are secured on one side only and can form a tapered bundle. What is meant by tapered bundle is a bundle of pins having the form of a bouquet, i.e. the cross-section of the bundle of pins 7 at the level of the assembly means is strictly smaller than the cross-section of the bundle of pins at the level of the free end, i.e. the end opposite the assembly means 8. However the pins 7 can be assembled in circular or oval manner, or with a flat cross-section, depending on the shape conferred by the assembly means 8.

The pins 7 can be secured at their end but the ends may not coincide, for example in the case of pins 7 of different lengths.

Even more preferentially, the assembly means 8 is positioned on the very end of the pins 7, the extreme edge of the pins, i.e. the pins are only salient on one side of the assembly means 8.

The assembly means 8 can be made from composite resin. The resin is chosen from methacrylate, polyether ether ketone (PEEK) and epoxide resins. It is also possible to achieve the assembly means 8 with a heat-shrink sheath.

The resin can contain additives, in the form of mineral or organic colorants, and also micrometric or nanometric particles designed to modify its consistence or mechanical performances.

For example, the pins 7 are secured by a sleeve made from polymerized composite resin. What is meant by sleeve is a cylindrical part open at least at one of its two ends.

The assembly means 8 can be achieved by sticking the ends of the pins with a composite glue. This technique is preferentially chosen when the ends of the pins are staggered. The ends of the pins are staggered in the assembly means 8 when a thin, pointed apex is required for the bundle of pins.

The assembly means 8 is configured to hold the pins 7 together when the latter are handled. It is also configured in such a way that it is possible to remove pins 7 one by one or in small quantities in the case where the structure which is to accommodate the bundle of pins is of smaller dimension than the bundle of pins.

When one or more pins 7 are removed, the assembly means 8 continues to secure the remaining pins. The energy required to tear a pin away from the bundle is lower than the energy required to open or break the assembly means 8. In this way, the size of the bundle of pins 7 is adaptable according to requirements.

In a preferred embodiment of the invention, the assembly means 8 does not prevent the pins 7 from sliding with respect to one another over at least a tenth of their length and it blocks them or retains them beyond this distance. For example, the pins 7 can slide with respect to one another along their large axis (axis BB' of FIG. 5). The pins 7 can cross one another inside the reinforcement structure.

In a preferential embodiment, at least one bundle of pins comprises an additional pin made from a material that is more easily etched than the plurality of reinforcement pins so as to form an etching canal.

When attempts are made to access an infected apex following a crown and root restoration, the risks of weakening or perforation of the canal walls are linked to the difficulty of etching the restoration in a controlled direction over the whole depth of the restoration.

The inventors observed that it is difficult to control the direction of etching on account of the hardness and strength of the reinforcement structures which are inserted in the crown and root dental restoration. When the posts are made entirely from metal or ceramic, etching of the post is uncontrollable. The same is the case when the canals are filled with a mixture of glue 9 and reinforcement pins 7.

As indicated in the foregoing, the canal is filled by a composite material which comprises at least one polymer resin associated with reinforcements in the form of pins.

The canal is filled by a composite element formed by materials having very different mechanical performances. These differences of mechanical behaviour are sought for to make the crown and root restoration easier to perform and to ensure a good transmission of stresses. However, these configurations considerably complicate etching operations to reach an infected apex. A modified reinforcement structure is therefore proposed which enables the etching step of an access canal following performance of a crown and root restoration to be secured.

It is proposed to insert a plurality of reinforcement pins in said at least one root canal through the through canal 3. The through canal 3 and root canal 2 are filled by the plurality of reinforcement pins 7 and the glue 9.

In order to facilitate access operations to the apical areas of the dental root, it is particularly advantageous to define a preferential etching canal 6 inside the reinforcement structure A.

This preferential etching canal is configured to be eliminated more easily than the reinforcement pins 7 of the reinforcement structure A. This preferential etching canal is configured to define a canal which will be etched more easily than the rest of the reinforcement structure A which will enable the risks of weakening or perforation of the canal walls to be reduced by imposing the direction of etching in the crown and root restoration.

In order to have a better control of the etching direction, the inventors propose to form a preferential etching canal which will be able to be etched more easily than the other materials of the restoration so as to be able to better impose the etching path.

The etching canal is advantageously made from a material which presents lower abrasion performances than the abrasion performances of the materials forming the reinforcement pins 7. In advantageous manner, the material forming the etching canal presents a lower hardness than the hardness of the material used to form the pins 7. In a preferential embodiment, the hardness of the material forming the etching channel is less than or equal to 90% of the hardness of the material forming the pins 7, even more preferentially less than or equal to 70% of the hardness of the material forming the pins 7.

The hardness can be a Vickers hardness or a Shore hardness depending on the materials used. It is also possible to use Rockwell, Brinell or Meyer hardnesses.

It is also advantageous to provide for the etching canal to be made from a material which presents lower abrasion performances than the abrasion performances of the material forming the polymer matrix 9 which fills the through canal and the root canal. In advantageous manner, the material forming the etching canal presents a lower hardness than the hardness of the material used to form the polymer matrix, i.e. the glue 9. In a preferential embodiment, the hardness of the material forming the etching canal is less than or equal to 90% of the hardness of the material forming the polymer matrix, even more preferentially less than or equal to 70% of the hardness of the material forming the polymer matrix.

The reinforcement structure A comprises an additional pin which is different from the reinforcement pins 7. The additional pin will define the preferential etching canal. Depending on the embodiments, the additional pin is fixed directly to the reinforcement pins 7 and/or to the assembly means 8. In a particular embodiment, the additional pin does not have any direct contact with the assembly means 8. In advantageous manner, the additional pin is in direct contact with at least one of the reinforcement pins 7.

The reinforcement structure A is used in the future crown and root restoration in order to form a preferential abrasion area which is surrounded by the reinforcement pins 7 which form reduced abrasion areas. The reinforcement pins 7 will force the drill bit into a predefined space so that it preferentially etches the etching canal. It is advantageous to provide for the additional pin to present a length equal to at least 90% of the smallest reinforcement pin 7 of the reinforcement structure A.

In order to efficiently impose the direction of depression of the drill bit when etching is performed, it is particularly advantageous to place the reinforcement pins 7 in contact with the etching canal. In this way, when the reinforcement structure A is inserted, the reinforcement pins 7 remain close to the etching canal.

In even more advantageous manner, the reinforcement pins 7 are in contact with the etching canal and are mechanically secured to the etching canal. In this way, when the reinforcement structure A is inserted, the reinforcement pins remain in contact with the etching canal. If the etching canal deforms while the crown and root restoration is performed, the same is the case for the pins 7. In such an embodiment, it is particularly advantageous to limit the space occupation of the reinforcement structure A by reducing the number of pins 7. As an alternative, it is possible to provide for certain reinforcement pins 7 to be fixed directly to the etching canal and for other pins 7 not to be fixed directly to the etching channel while at the same time being secured by means of the assembly means 8. The pins that are not fixed to the etching canal can fill the dental canal in order to reinforce the future crown and root restoration.

In a preferential embodiment, the additional pin forming the etching canal is fixed to the pins 7 over a distance representing at least 70% of its length.

In this configuration, the shape taken by the future etching canal inside the dental canal is also taken by the plurality of reinforcement pins 7 which will impose the direction of the drill bit when the future etching step is performed. It is particularly advantageous to provide for the future etching canal 6 to be fixed to the reinforcement pins 7. In this way, several reinforcement pins 7 are secured to one another and are deformed in the same way.

When the preferential etching canal is eliminated, the reinforcement pins 7 which surrounds the etching canal will coerce the drill bit to force it to follow the direction of the etching canal. The risks of perforation of the canal walls due to a drill bit which was depressed in a wrong direction are greatly reduced.

It is advantageous to provide for the reinforcement pins 7 to present a length at least equal to that of the etching canal, the length being taken from the location of the assembly means 8.

It is possible to provide for each pin 7 to present a free end that is movable in flexion with respect to the other pins 7 of the bundle of pins. The pins are preferentially salient from the etching canal in the direction of the longitudinal axis in the areas that are free from flexion.

In a particular embodiment, the reinforcement structure A comprises at least one pin which presents a free end that is movable in flexion and in translation with respect to the other pins 7 of the bundle of pins and for example with respect to the pins 7 fixed to the etching canal. The pins 7 can thus slide freely with respect to one another along their large axis while being curbed by their reciprocal friction.

The maximum diameter of the etching canal is advantageously smaller than 1.2 mm. In these configurations, the materials forming the etching canal are in fact protected by the reinforcement pins 7.

The inventors observed that when the etching canal is used on its own, i.e. outside the reinforcement structure A with surrounding reinforcement pins 7, the constraints on its use linked to the etching canal are great. If the etching canal is too rigid, it is liable to break when it is inserted in the dental canal 2 as it will not be able to deform easily to follow the shape of the dental canal 2. If on the other hand the material is too flexible or too fluid, the etching canal will not be able to support its weight. Insertion will then be very difficult and the etching canal will be deformed without following the shape of the dental canal 2. It is also apparent that these execution constraints will favour the implementation of etching canals having large diameters which is not always usable.

On the contrary, in the proposed reinforcement structure A, if the material of the additional pin is too rigid, it may crack but it will remain secured to the reinforcement pins 7 which will define the shape of the etching canal. If on the other hand the material is too flexible, it will not hold on its own but it is supported by the reinforcement pins 7.

The above-mentioned configurations are therefore particularly advantageous as they allow a greater choice in the materials able to be used to form the etching canal and in the dimensions able to be used.

The etching canal can for example be formed using a thermoplastic material and preferentially a thermoplastic elastomer. It is particularly advantageous to provide for the formation of an etching canal made from polyisoprene and advantageously from synthetic polyisoprene. It is also possible to make the etching canal from cis-1,4-polyisoprene or from trans-1,4-polyisoprene and advantageously from a trans-1,4-polyisoprène having a molecular weight comprised between 16,000 and 18,000 g/mol. It is particularly advantageous to make the etching canal 6 from gutta-percha (in its alpha, beta and gamma forms) or from gutta-balata. In a particular embodiment, the etching canal is devoid of polymerizable resin. It is particularly advantageous to provide for the etching canal to be exclusively made from thermoplastic material or from textile material impregnated with resin.

The use of gutta-percha is particularly advantageous as it can be charged with radio-opaque elements enabling the etching canal 6 to be easily observed after the crown and root restoration, before or during the etching step, in order to determine the distance separating the hole formed and the dental wall.

In a particularly advantageous embodiment, the material forming the etching canal comprises 20% by weight of gutta-percha, between 35% and 75% by weight of zinc oxide, and between 2% and 30% by weight of barium sulphate which enables the mixture to be made radio-opaque. It is also possible to add between 1 and 4% by weight of a plasticizing agent, for example a wax and/or a resin in order to obtain the required viscosity.

It is advantageous to fill the dental canal 2 with a polymer material 9 which is an organic matrix and more particularly with a material chosen from acrylate resins, methacrylate resins, polymethyl methacrylate resins, dimethacrylate urethane resins, and bis phenol-a-glycidil dimethacrylate-epoxy resins.

In this way, it is then possible to etch the preferential etching canal inside the reinforcement structure A of the crown and root dental restoration, the preferential etching canal enabling the direction of depression of the drill bit in the dental restoration to be imposed.

Advantageously, the assembly means 8 does not prevent the pins 7 that are not secured to the etching canal, also called micro-posts, from moving relatively to one another in all three dimensions.

It is particularly advantageous to polymerize the glue 9 which is preferentially a composite resin so as to fix the prosthesis 1 with the root canal 2 and the reinforcement pins 7.

As a less advantageous alternative, the reinforcement structure 1 is fitted in the dental canal 2 before the through canal 3 and root canal are filled with the glue 9.

Polymerization of the glue 9 is performed whereas the reinforcement structure A is located in the dental canal 2 before its position is finally fixed.

In order to facilitate access to the bottom of the restoration, it is particularly advantageous to place the reinforcement structure A provided with an etching canal in the centre or substantially in the centre of the dental canal 2 in a cutting plane which is perpendicular to the longitudinal axis of the dental canal 2. The inventors observed that the highest mechanical stresses are located on the edge of the root canals 2. By placing the etching canal in the centre of the root canal 2, access is secured without modifying the general strength of the restoration. The other reinforcement structures A which are placed in the restoration and at the periphery ensure a good mechanical strength being placed at the periphery.

Depending on the embodiments, the assembly means 8 extends beyond the dental canal (FIG. 9). The latter embodiment is advantageous as the assembly means 8 can be eliminated once the reinforcement pins 7 have been securedly fitted in the through canal 3 and the root canal 2.

The bundle of pins 7 coated with glue 9, in intimately close contact with the walls of the root canal 2 and of the through canal 3, forms a mechanically compact and coherent assembly, thereby achieving a continuity of volume, participating in distribution of the stresses without load interruption and without presenting stress concentration areas liable to lead to fractures.

It is advantageous to provide for the glue 9 to be a resin able to be activated by a chemical initiator and/or by an electromagnetic radiation which is preferably a visible radiation. Polymerization enables a crown and root dental restoration to be constituted ensuring its rigidity due to its shape and to the architecture of its reinforcements.

The number of pins and/or the diameter of the pins inserted in the canals 2 and 3 are adjusted according to the shape and size of the cavity designed to receive the reinforcement structures A.

When the reinforcement structure A does not comprise an etching canal, the pins 7 of each reinforcement structure A are advantageously independent from one another and adjust by flexion to match the natural morphology of a dental canal 2 without drilling to a defined shape.

According to a preferential embodiment, the assembly means 8 is a heat-shrink sleeve. What is meant by heat-shrink is a part having the property of retracting due to the action of heat. What is meant by sleeve is a casing, a sheath that is able to adjust to the shape and size of the bundle of pins. The assembly means 8 is advantageously used as gripping means.

Preferentially, and as represented in FIG. 9, the reinforcement structures A, provided with a heat-shrink sleeve, are inserted in the canal—the pins 7 are located at the level of the root part of the canal and the assembly means 8 is positioned above the crown part. The assembly means 8 is in distal position with respect to the apical part of the dental canal.

In this configuration (assembly means located opposite the apical part of the dental canal), the assembly means 8 can be eliminated on completion of the crown and root dental restoration operation.

The number of reinforcement structures A inserted in the dental canal 2 depends on the size of said canal. In advantageous manner, from one to ten reinforcement structures A are inserted in the dental canal 2.

The crown and root restoration can be performed for example on laboratory dental models. The crown and root dental restoration snugly fits and respects the anatomical and physiological particularities of the root canal 2.

The reinforcement structure or structures A extend throughout the volume of the root part and of the supragingival crown part of the crown and root dental restoration. They enable the whole of the material of the restoration constituting the crown part but also the root part to be consistently reinforced.

Figure 11:
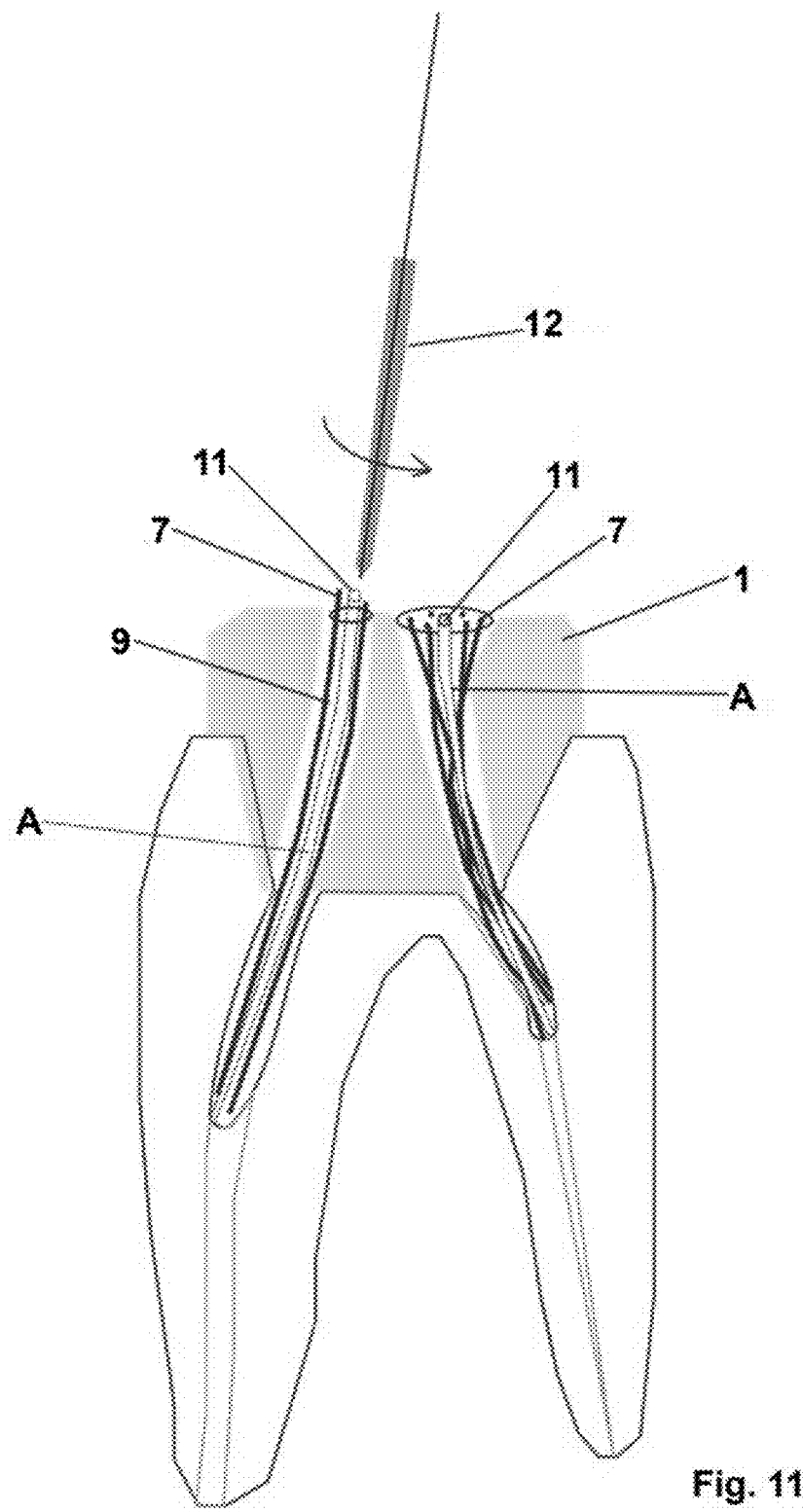
FIG. 11 represents etching of a canal inside a crown and root restoration according to the invention, in schematic manner.

After the crown and root restoration has been performed, if it is necessary to access an infected apex, the top part of the restoration can be eliminated so as to access the etching canal and the reinforcement pins 7. The etching canal is advantageously etched by means of a drill bit. The pins 7 and/or glue act as guide to impose depression of the drill bit in the direction defined by the etching canal. The glue 9 and/or reinforcement pins 7 will form a guide for the drill bit so that the latter follows the shape of the etching canal 11 as illustrated in FIG. 11.

Etching is made easier than in embodiments of the prior art where a more homogenous material is formed to achieve the crown and root restoration or without having control of the configuration of an etching canal.

In advantageous manner, the material forming the matrix is etched more quickly than the material forming the reinforcement pins 7. It is therefore advantageous to choose the material used to form the etching canal according to the material used to impose the position of the drill bit 12.

The invention claimed is:

1. Crown and root dental restoration comprising:
    a prosthesis forming the crown of the restoration comprising at least one through canal, the at least one through canal having one end configured to open into at least one root canal and another end opening into an outer face of the crown, the at least one through canal configured to form along with the at least one root canal a cavity extending along a first direction,
    a plurality of reinforcement pins forming the root of the restoration arranged in the at least one root canal and in the at least one through canal, at least one reinforcement pin of the plurality of reinforcement pins adapted to connect the at least one through canal with the at least one root canal, each reinforcement pin extending along a direction matching the first direction, the reinforcement pins having a length smaller than a height of a sum of the through canal and a dental root along the first direction,
    a glue filling the at least one root canal and the at least one through canal, the glue contacting sidewalls of the at least one through canal, sidewalls of the at least one root canal, and sidewalls of each reinforcement pin,
    wherein the prosthesis is made from a material having a higher Young's modulus than a Young's modulus of the glue and higher than a Young's modulus of a material forming the plurality of reinforcement pins, wherein the reinforcement pins are made of a flexible material and follow a shape of the at least one through canal and the at least one root canal and are embedded independently by the glue in intimate contact with walls of the at least one root canal and of the at least one through canal, and wherein the glue makes a chemical and mechanical connection between the walls of the root canal and the reinforcement pins, the chemical and mechanical connection between the walls of the at least one root canal and the prosthesis and ensuring fixation of the prosthesis to walls of a pulp chamber.

2. Crown and root dental restoration according to claim 1, comprising an additional pin made from a material having a hardness lower than a hardness of a material forming the plurality of reinforcement pins.

3. Crown and root dental restoration according to claim 1, wherein the at least one through canal is curved.

4. Crown and root dental restoration according to claim 1, comprising a single additional pin made from a material etched more quickly than a material forming the plurality of reinforcement pins.

5. Crown and root dental restoration according to claim 1, wherein the reinforcement pins have a length representing at least 50% of a height of the prosthesis.

6. Crown and root dental restoration according to claim 5, wherein the reinforcement pins have a length representing at least 80% of a height of the prosthesis.

7. Crown and root dental restoration according to claim 1, wherein the reinforcement pins are deformed independent from one another and have a shape matching a shape of the cavity.

8. Crown and root dental restoration according to claim 1, wherein the root canal has a natural morphology.

9. Crown and root dental restoration according to claim 1, wherein the plurality of reinforcement pins are formed by reinforcement pins having different height and presenting staggered ends in the root canal.

10. Crown and root dental restoration according to claim 1, wherein the plurality of reinforcement pins comprises from 2 to 15 reinforcement pins.

11. Crown and root dental restoration according to claim 1, wherein the reinforcement pins are formed by at least one fibre coated with a first polymer matrix and totally polymerized individually.

12. Crown and root dental restoration according to claim 1, wherein the reinforcement pins have a diameter comprised between 0.1 mm and 0.5 mm.

13. Crown and root dental restoration according to claim 10, wherein the reinforcement pins have a diameter of between 0.1 mm and 0.5 mm.

14. Crown and root dental restoration according to claim 1, wherein the prosthesis is made from a material that presents a flexural strength greater than or equal to 300 MPa and a modulus of elasticity greater than or equal to 80 Gpa.

15. Crown and root dental restoration according to claim 1, wherein the prosthesis forms a crown part of the crown and root dental restoration.

* * * * *